May 23, 1972    H. CARDONA    3,664,730
OPHTHALMOSCOPE
Filed Oct. 15, 1970    4 Sheets-Sheet 2
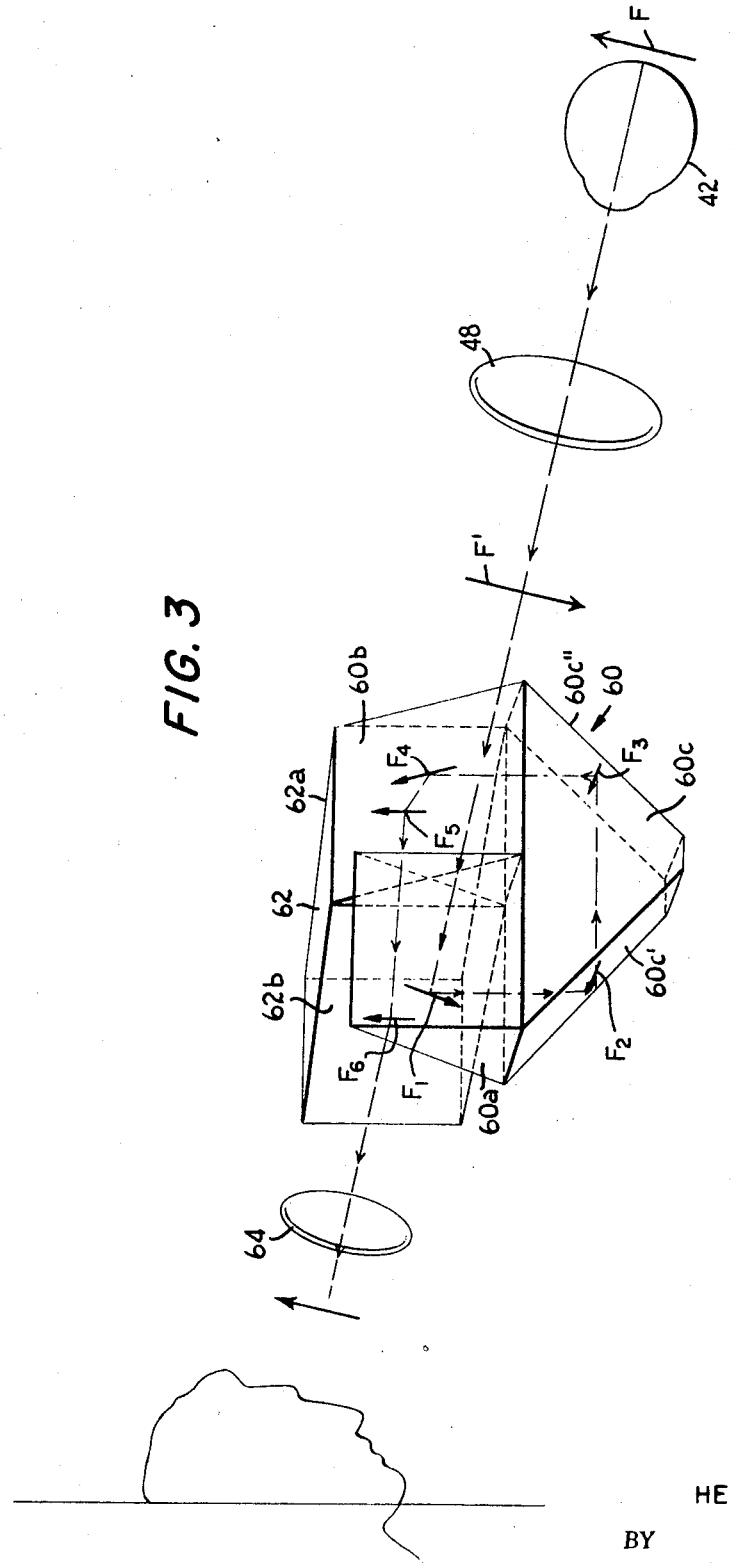
INVENTOR.
HERNANDO CARDONA
BY
Brumbaugh, Free, Graves & Donohue
his ATTORNEYS

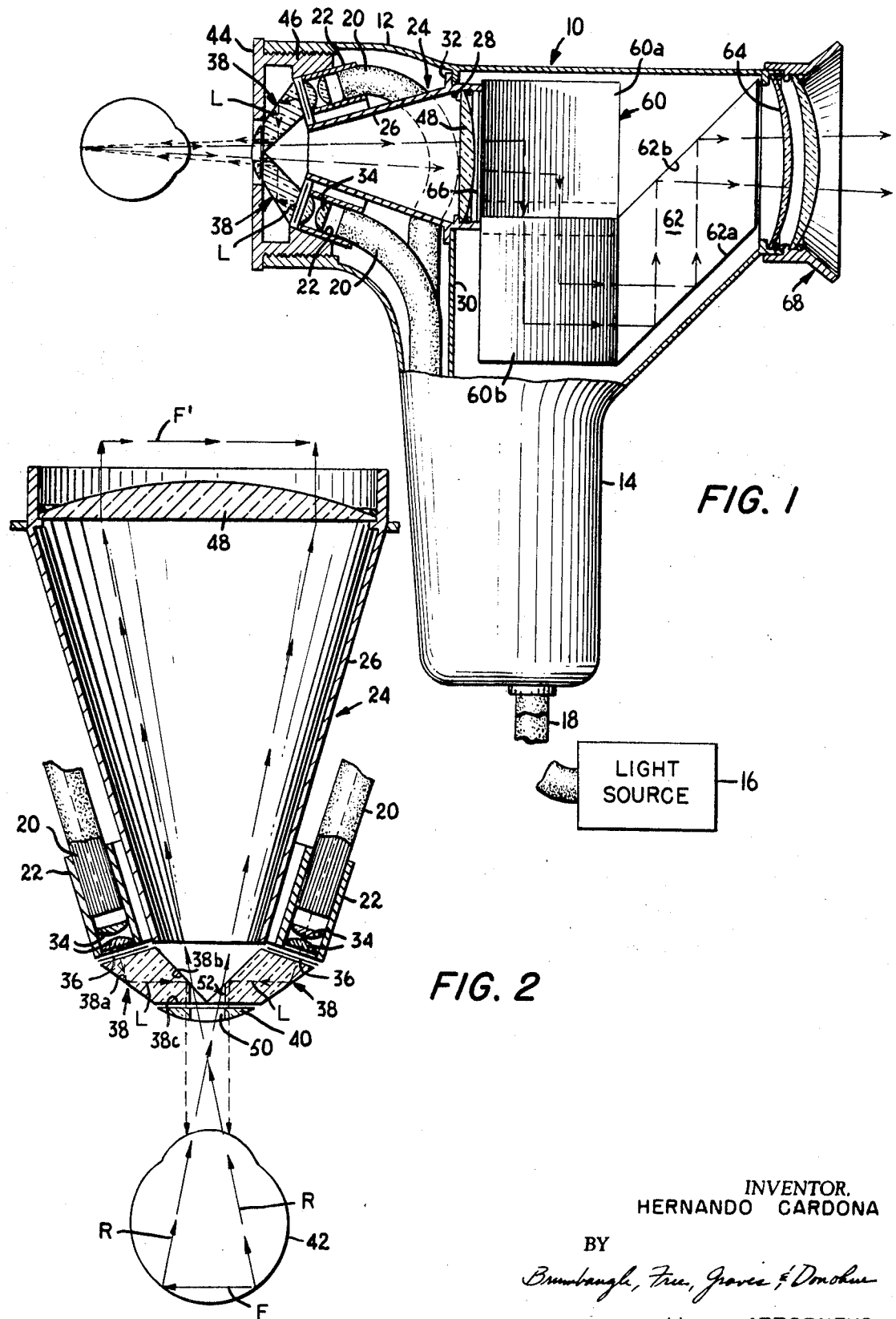

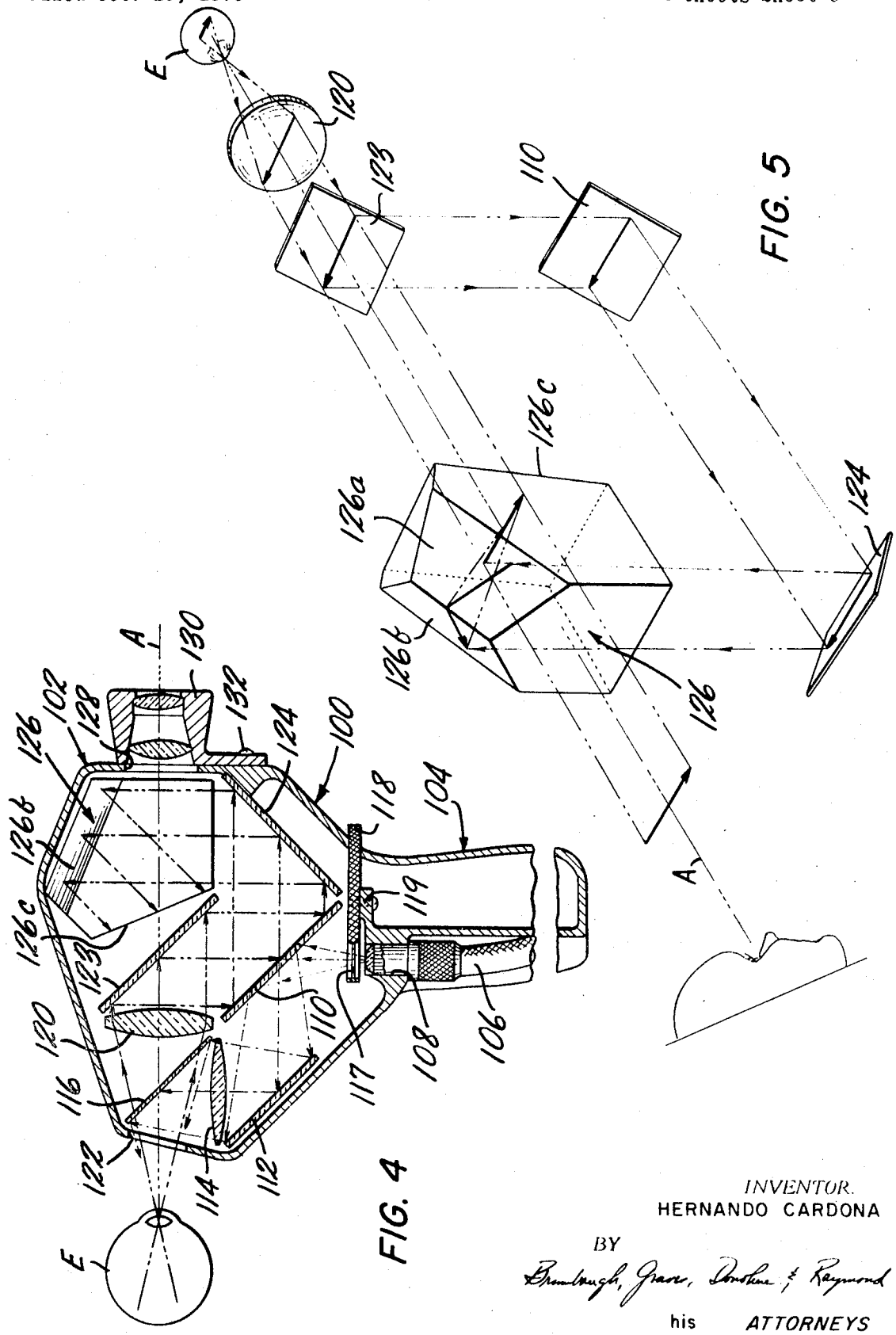

May 23, 1972   H. CARDONA   3,664,730
OPHTHALMOSCOPE
Filed Oct. 15, 1970   4 Sheets-Sheet 4
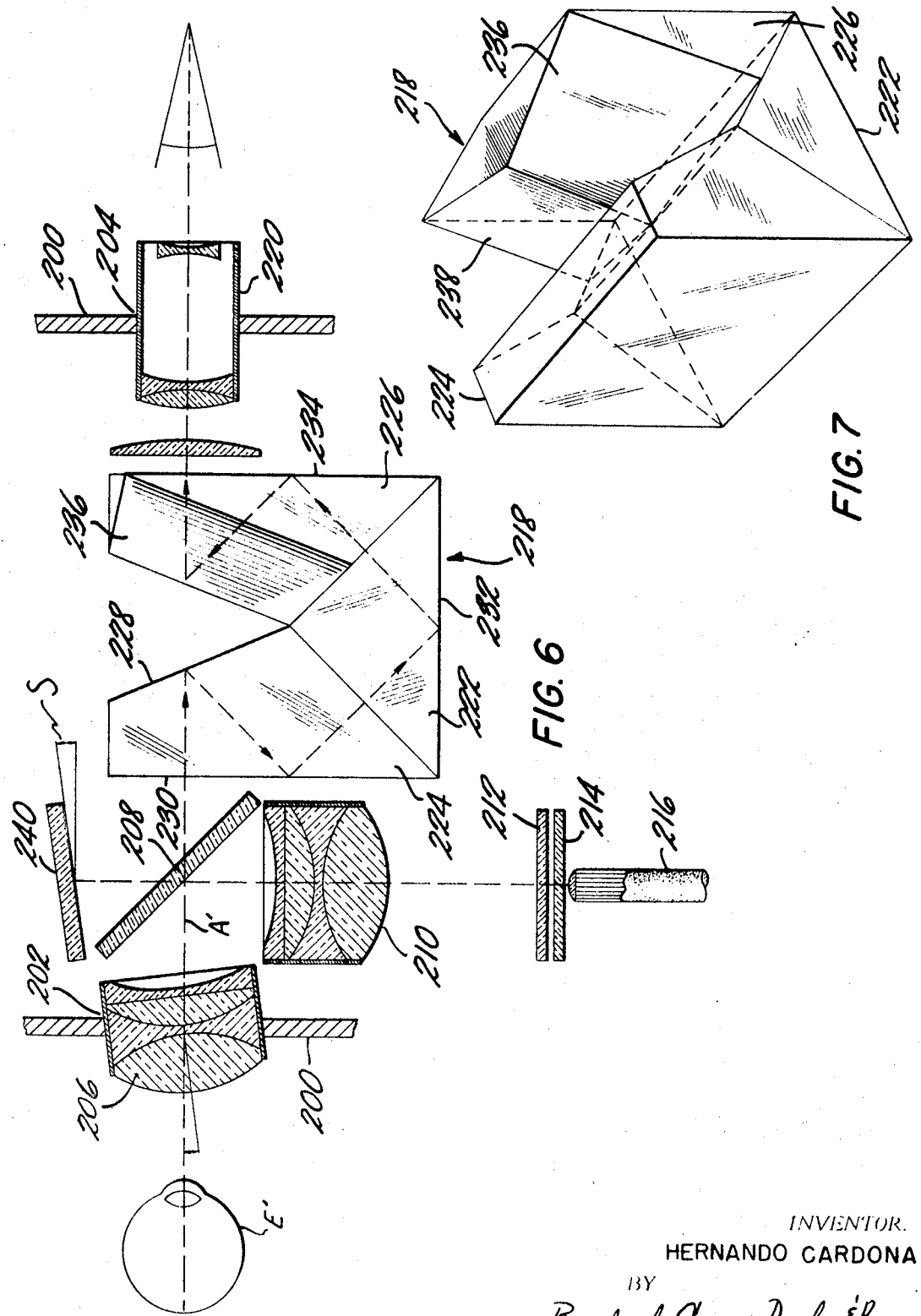
INVENTOR.
HERNANDO CARDONA
BY
Brumbaugh, Graves, Donohue & Raymond
his ATTORNEYS

United States Patent Office 3,664,730
Patented May 23, 1972

3,664,730
OPHTHALMOSCOPE
Hernando Cardona, 600 W. 115th St.,
New York, N.Y. 10025
Continuation-in-part of application Ser. No. 839,785, Jan. 21, 1969, which is a continuation-in-part of application Ser. No. 473,466, July 20, 1965. This application Oct. 15, 1970, Ser. No. 81,078
Int. Cl. A61b *3/12;* G02b *17/00, 5/04*
U.S. Cl. 351—6                6 Claims

ABSTRACT OF THE DISCLOSURE

An ophthalmoscope includes provision for correcting the image to provide an erect and unreversed image of the eye fundus which can be viewed along a direct line of sight. The correction of the image can be accomplished by the use of a roof prism. Provision is made for illuminating the fundus with light conducted to the case of the scope by a light-conducting cable.

BACKGROUND OF THE INVENTION

This application is a continuation-in-part of copending application Ser. No. 839,785, filed Jan. 21, 1969 and now abandoned. That application is a continuation-in-part of application Ser. No. 473,466, filed July 20, 1965 and now abandoned.

The invention relates to ophthalmoscopes and, more particularly, to a novel and improved ophthalmoscope which forms an erect and unreversed image of an eye fundus in alignment with the axis between the observer and the patient's eye.

One presently known type of ophthalmoscope includes an instrument which consists of an illuminating lamp and a projection system for directing a beam of light onto the patient's fundus and a binocular viewer for directing the fundus image to the observer's eyes. This instrument is mounted on a bracket worn by the observer. The fundus image is directed to the binocular view by a condensing lens held in the hand of the observer. The image viewed by the observer using this type of ophthalmoscope is properly oriented laterally, that is, unreversed, but is inverted. Accordingly, the observer must mentally convert the visual information he receives to obtain an accurate picture of the eye fundus. For example, the accurate location of fundus defects on a chart made during an eye examination requires transposition to the side of the horizontal axis opposite from the side in which they are observed. The same transposition is necessary during surgical operations, and the chance of error arising from the invention of the fundus image is substantial and can have serious consequences. In addition to the disadvantage of forming an inverted image, this type of ophthalmoscope can quickly become burdensome because of the weight of the illumination and binocular viewer instruments, and the heat generated by the illuminating lamp further contributes to the user's discomfort.

Another problem with most presently known ophthalmoscopes is back-reflection of light from the condensing lens, the illuminating light being directed from a lamp onto the fundus through the same condensing lens used for observation of the fundus. Light is reflected back from the condensing lens and significantly detracts from the clarity of the fundus image.

SUMMARY OF THE INVENTION

There is provided, in accordance with the present invention, an ophthalmoscope comprising a case adapted to be hand-held, an illuminating means for directing a beam of light onto an ocular fundus of a patient, and an optical system for forming an erect and unreversed image of the eye fundus aligned with the visual path between the observer and the eye fundus. More particularly, the case includes a body portion containing the illuminating and optical systems and a handle portion which can be readily gripped by the fingers of the user. Preferably, the case is dimensioned so that the user's index finger engages the top of the body portion and the handle portion is gripped between the palm of the hand and the remaining three fingers. The user's thumb is wrapped around the back part of the handle portion. This arrangement for the ophthalmoscope case facilitates accurately aligning and holding the ophthalmoscope steady in the desired position.

The illuminating system of the ophthalmoscope preferably includes a remote light source and one or more light-conducting fiber cables for transmitting the light from the source to the case of the scope.

The illuminating system may comprise a prism for each light-conducting cable. To permit the image of the fundus to pass to the objective lens of the ophthalmoscope, openings disposed about the line of sight of the scope are formed in them. The illuminating system prisms are preferably positioned so that surfaces through which the light passes in leaving them lie in the focal plane of the objective lens, thus minimizing the size of the opening and enabling the fundus to be illuminated by light beams aligned very close to parallel to the line of sight of the ophthalmoscope. Any interference with the fundus image, such as that created by back reflection in conventional instruments, is minimized and the illumination of the fundus is considerably enhanced by the directness of the light.

Alternatively, the illuminating system of the ophthalmoscope may employ a semi-transparent mirror located on the line of sight of the scope. The light beam is reflected by the mirror to the eye fundus along the line of sight, while the fundus image passes from the fundus through the mirror to the objective lens. A light trap may be provided so as to arrest any light which passes through the mirror. Preferably the light trap and the objective lens are both offset by small angles to further reduce reflections.

The ophthalmoscope includes an objective lens, which receives the image directly from the eye through the passage formed by the openings in the prisms and condensing lens, and an image correcting means for re-inverting the inverted image of the fundus. It will be noted that the lens of the eye inverts the fundus image as observed from in front of the cornea.

One form of image correcting means includes a first triangular prism, which is aligned with the line of sight of the scope and has a hypotenuse reflecting surface for reflecting the fundus image in a direction substantially perpendicular to the line of sight. The image reflected from the first prism is directed through a Porro prism, which includes reflecting surfaces lying in planes perpendicular to each other and parallel to the line of sight. The Porro prism reflects the image transversely in a direction perpendicular to the line of sight. From the second reflecting surface of the Porro prism, the image is reflected to the hypotenuse face of a second triangular prism, from which it is reflected in a direction parallel to the line of sight.

The image reflected from the second triangular portion of the erecting prism is displaced laterally from the line of sight. To transpose the image back to that line, the ophthalmoscope includes a rhomboidal prism having parallel faces which reflect the fundus image transversely and back into alignment with the axis of the ophthalmoscope. The image reflected from the second surface of the rhomboidal prism is viewed by the observer through an eye piece.

Another form of image correcting means for the ophthalmoscope may include a series of plane mirrors positioned to reflect the image formed by the objective lens through a total included angle of 180°, thereby to reinvert the fundus image, and a Penta prism for restoring the reversed image formed by the objective lens to its actual transverse orientation. This form of erecting system offers the desirable attributes of minimum space and weight requirements for the erecting system, particularly in the dimension transverse to the Penta prism, and thus provides a compact, light weight instrument.

Still another form of the image correcting means includes a composite prism having three sections. The first section forms a base and is triangular in cross section. The second section is quadrangular in cross section and is adjacent to the first section. The third section is also adjacent to the first section and forms a roof prism. An ophthalmoscope which includes this type of image correcting means is preferred because it is most compact and durable and does not require that mirrors be aligned with the prism.

An important advantage of the ophthalmoscope of the invention is that it produces an unreversed and erect image, that is an image which is identical to the image of the eye fundus as it would appear from a point within the eye. This considerably facilitates the charting of fundus defects, when the ophthalmoscope is used for examination of the fundus and, more importantly, facilitates operative procedures by making it unnecessary to mentally correct the orientation of the image. Also of importance is the fact that the fundus image formed by the ophthalmoscope is oriented on the direct line of sight between the eye fundus and observer. If this were not the case, manipulation of surgical instruments would be very difficult and would be a source of possible error. Also, the ophthalmoscope is completely self-contained and hand-held, thus freeing the user from the nuisances of a head-carried instrument or multiple devices. The light source is remote from the ophthalmoscope and is therefore not a source of heat. Moreover, the illuminating light beam radiates onto the eye fundus from a region close to the axis of the instrument, and in a direction close to parallel to that axis, thereby providing improved illumination. The image formed by the ophthalmoscope can, of course, be viewed through a magnifying monocular eye piece or through a binocular viewer and can be photographed with an ordinary camera through the eye piece.

DESCRIPTION OF THE DRAWINGS

For a better understanding of the invention, reference may be made to the following description of exemplary embodiments, taken in conjunction with the figures of the accompanying drawings, in which:

FIG. 1 is a side view in section of one embodiment of the ophthalmoscope, the section being taken generally along a plane through the axis of the objective lens, but with the erecting prism and rhomboidal prism being shown in elevation;

FIG. 2 is a view of a portion of the ophthalmoscope of FIG. 1, the view being on an enlarged scale relative to FIG. 1;

FIG. 3 is a diagrammatic illustration of the FIG. 1 ophthalmoscope optical system showing, particularly, a pictorial view of the erecting prism and rhomboidal prism the prisms, however, being shown in different orientations from their orientations in FIG. 1;

FIG. 4 is a side view in section of another embodiment of the ophthalmoscope, the section being taken generally along a vertical-axial plane of the instrument, but with the Penta prism being shown in elevation;

FIG. 5 is a diagrammatic illustration of the optical system of the embodiment of FIG. 4, the parts of the system, however, being separated more widely than as shown in FIG. 4 for greater clarity;

FIG. 6 is a side view in section of still another embodiment of the ophthalmoscope, the prism of which is, however, shown in elevation, and the case of which has been removed; and FIG. 7 is an isometric three-dimensional view of the prism shown in FIG. 6.

DESCRIPTION OF THE PREFERRED EMBODIMENT

Referring to FIG. 1, one embodiment of ophthalmoscope, as shown in FIGS. 1 to 3, includes a case 10 having a body portion 12 and a handle portion 14 extending downwardly from and, preferably, formed integrally with the body portion 12. The case 10 is dimensioned so as to be hand-held by engaging of a forefinger over the top of the front part of the body 12, holding the handle 14 between the palm of the hand and the remaining three fingers, and engaging the thumb around the back of the handle 14. This construction of the case 10 provides excellent control of the instrument, facilitating aligning it with the eye and holding it steady. The case 10 can, of course, also be suitably affixed in a bracket for use with a stand. The case 10 is preferably constructed so as to be fluid tight, thereby enabling sterilization for use in surgery, such as by immersion in a 1:500 solution of Zephiran one hour before use.

The illuminating system of the ophthalmoscope includes a remote light source 16, preferably of variable intensity, which focuses a beam of light on one end of each of a pair of light-conducting fiber cables 18. The cables enter the case 10 through the handle 14, and the output ends are inserted in sockets 22 in a mounting member 24. The mounting member includes a generally conical-shaped body 26, and the larger end is received in an opening 28 in an interior wall 30 formed on the case body 12 and is oriented in position by flanges 32.

The output ends 20 of the light-conducting fiber cables 18 are spaced equidistant from the axis of the instrument, lie in the plane of the axis and form angles of 17° with the axis. The light beams radiating from each of the cables, as represented by the arrowed lines designated L in the drawings, pass through condensing lens sets 34 and suitable color filters 36 mounted in the sockets 22 and enter a hexagonal, compound reflecting prism 38.

Each of the prisms 38 includes a first reflecting surface 38a, which is disposed at an angle of 36½° to the line of sight of the instrument and reflects the light beam emanating from the light conducting cables inwardly toward the axis of the instrument. The light reflected from the first surface is reflected by a second reflecting surface 38b, which lies in a plane forming an angle of 45° with the line of sight, in a direction substantially parallel thereto. The beam then passes through a light transmissive surface 38c of the prism and a condensing lens 40 onto the fundus of the observed eye 42. The condensing lens 40 is mounted in an end piece 44 (FIG. 1), which is threaded into the body of the case and which is provided with a flange 46 for engaging the mounting member 24 in position in the case.

The image of the eye fundus, which is schematically represented in the drawing by an arrowed line F, comprises, for example, light rays R which are refracted by the eye itself and pass into the ophthalmoscope and into an objective lens 48 fixed in the mounting member 26 which is part of the case 10 and defines an image-receiving aperture, the exemplary rays passing in the general directions shown in FIG 2. The light rays R enter through a passage centered on the axis of the objective lens formed by a circular hole 50 in the condensing lens 40 and semicircular holes 52 in the respective prisms 38. The passage is of a sufficient size to enable the desired portion of the fundus to be viewed through the objective lens.

In the embodiment of FIGS. 1 to 3, the objective lens has a focal distance of 42 millimeters, the hole has a diameter of 4 millimeters and the field of view of the eye fundus constitutes a 35° segment of the eye. The field of vision can, however, be suitably altered by replacing the objective lens and prism assembly, the mounting member 24 being readily removable and replaceable by another mounting member carrying suitable elements for the desired illuminating system and optical system.

An important feature of the embodiment of FIGS. 1 to 3 is that the prisms 38 are located so that the light transmissive surfaces 38c, through which the light passes in leaving the prisms, lie in the focal plane of the objective lens. In this position the prisms are located at the shortest possible distance from the line of sight of the ophthalmoscope attainable without interfering with the field of view. This enables the light beams to be directed onto the eye fundus along a path very close to parallel to the line of sight, thereby providing optimum utilization of the available light.

The image of the eye fundus, when viewed from a place outside the external focal point of the eye is inverted due to refraction by the eye itself. Thus, the image of the eye, when viewed through the objective lens 48 as represented by the line F', is also inverted. To enable an erect and unreversed image to be viewed through the ophthalmoscope, it includes an erecting prism 60 which is mounted in the body of the case 10.

Referring to FIGS. 1 and 3, the erecting prism 60 includes a pair of side-by-side triangular sections 60a and 60b. The hypotenuse face of each of the triangular sections is defined by perpendicular lines, one of which is perpendicular to the line of sight of the scope and the other of which forms an angle of 45° with the line of sight. The erecting prism 60 further includes a Porro prism section 60c having opposed faces lying in planes parallel to the line of sight and perpendicular to each other.

In order to conveniently show the optical path traversed by the light rays R representing the fundus image F, arrowed lines, designated by the letter "F" with a numerical subscript, are illustrated in FIG. 3 on the reflecting faces of the erecting prism indicating the apparent images at those faces. In FIG. 3 the prisms are shown rotated 90° about the ophthalmoscope axis, with respect to FIG. 1, the top surfaces in FIG. 3 being the front surfaces in the view of FIG. 1.

The triangular portion 60a is oriented with its hypotenuse face approximately centered on the line of sight of the scope. The fundus image $F_1$ formed on hypotenuse face of the triangular portion 60a is reflected vertically downwardly, with respect to FIG. 3, onto the oppositely located surface 60c' of the Porro prism 60c, as represented by the image $F_2$. The image $F_2$ passes transversely across to the other surface 60c'' of the Porro prism, as represented by the image $F_3$, and is reflected by that surface vertically upward to form an image $F_4$ on the hypotenuse face of the second triangular prism 60b. It will be observed that the image $F_4$ is erect, and it will be understood, moreover, that the image formed by the objective lens 48 is not only inverted by the erecting prism but is also reversed. Accordingly, the image $F_4$ is an erect and unreversed image of the eye fundus and corresponds to an actual view of the fundus as it would appear, unrefracted, from within the eye itself.

The image $F_4$, as viewed from in front of the triangular portion 60b of the erecting prism, is displaced from the axis of the objective lens and therefore from the direct line of sight between the observer and the eye. In order to bring the image back into the line of sight, a rhomboidal prism 62 is mounted in the case 10 adjacent the erecting prism. The rays of light forming the image $F_4$ pass out of the triangular portion 60b and onto the surface 62a of the rhomboidal prism, as represented by the image $F_5$. The rays are reflected from the surface 62a onto the opposite parallel surface 62b, as represented by the image $F_6$. The image appearing at the surface 62b of the rhomboidal prism 62 is positioned properly on the line of sight between the observer and the eye. The real image of the fundus of the eye formed by the objective lens and the erecting and rhomboidal prisms is viewed by the observer through an eye piece lens 64 mounted in an image-viewing aperture defined by the back end of the case 10.

As accessories to the ophthalmoscope, a reticule 66 can be mounted behind the objective lens 48 for purposes of locating points on the fundus image. In addition, a removable monocular, magnifying eye piece 68 can be installed over the back of the case to provide a magnified view of a portion of the fundus image formed by the ophthalmoscope and a binocular viewer (not shown) can be used by the observer to view, through both eyes, the fundus image formed by the ophthalmoscope.

Referring next to FIGS. 4 and 5 of the drawings, an alternative embodiment of the ophthalmoscope includes a case 100 having a shape generally similar to the embodiment of FIGS. 1 to 3, except that it is somewhat reduced in width relative to length by virtue of the alternate form of image correcting means (discussed below). Like the embodiment of FIGS. 1 to 3, the case 100 has a body portion 102 and a handle portion 104 depending from the lower part of the body portion; and is dimensioned so that it can be held by the hand in much the same way as the embodiment of FIGS. 1 to 3.

The illumination means of the embodiment of FIGS. 4 and 5 also employs a remote source of light (not shown) and a flexible light-conducting fiber cable leading from the light source and having its free end received in a socket 108 in the case handle 104. A collecting lens at the upper end of the socket 108 directs the light onto a plane mirror 110 disposed at an angle of 45° to the direction of the beam of light emitted from the cable 106. The light beam is reflected from the mirror 110 in a direction substantially parallel to the line of sight A of the ophthalmoscope onto a second plane mirror 112, also disposed at 45°, and is reflected from the mirror 112 through a condensing lens 114 onto a semi-transparent, or so-called half-mirror, 116 of a suitable type. The semi-transparent 116 is disposed at 45° to the line of sight A of the instrument and therefore reflects the beam of light along the line and onto the fundus of the patient's eye, which is designated in the drawing by the reference letter E.

As embodied in FIGS. 4 and 5, the ophthalmoscope may, as a further feature, include an array of filters 117 carried by a disc 118 which is mounted for rotation on a mounting pin 119 near the upper end of the handle. The filters 117 are of various colors and are arranged in a circle about the pivot pin 119 so as to be positioned in the path of the light beam from the cable 106 upon rotation of the disc. In addition to colored filters, which as is well known to ophthalmologists are of great value in diagnosis work, the disc 118 may carry one or more reticules of suitable form. The image of the reticule will be conducted along the path of the light beam and will show up in the observed image. The position of the filter disc 118 may be such that it can readily and conveniently be rotated by the user's thumb so that the handling of the instrument, including changing filters, can be accomplished with only one hand, leaving the other hand free for other activities. An appropriate type of detent (not shown) may be used to hold the disc in its selected positions.

The optical elements of the ophthalmoscope of FIGS. 4 and 5 include an objective lens 120 mounted in the case on the line of sight A, and the image of the eye fundus passes through an image-receiving aperture 122 defined by the case body 102. The objective lens 120 of this embodiment and, indeed, the lens 114 for the illuminating system as well as the lenses in the embodiment of FIGS. 1 to 3 are preferably aspheric type lenses, thus eliminating the need for composite multipart lenses. The lens 120 may be designed to provide a field of view of the eye fundus of on the order of 20 to 35° and will have a focal distance dependent upon, among other factors, the desired field of view. The case may be designed so that different lenses can be readily installed to meet the needs and desires of the user. The lens 120 is preferably mounted so that its optical axis forms a small angle of about 2 to 10° with the line of sight of the scope.

As discussed above in conjunction with the embodiment of FIGS. 1 to 3, the image of the eye fundus is reversed and inverted by the lens of the eye E. In accordance with the invention, the ophthalmoscope of FIGS. 4 and 5 provides for correcting the image by reinverting and again reversing it by means of a plurality of reflecting surfaces. More particularly, the image correcting means comprises a plane mirror 123 positioned behind the objective lens 120 on the line of sight A of the instrument and forming an angle of 45° with that line. The image of the lens 120 is reflected by the mirror 123 in a direction perpendicular to the line of sight, in this case vertically downwardly therefrom. The image is then intercepted by the plane mirror 110; it will be recalled that the mirror 110 forms a part of the illumination means, so it has a dual function. Consequently, the need for providing an additional mirror and the weight penalty of such an additional mirror are avoided by the expedient of the dual use of the mirror 110. Only one silvered surface is needed in the mirror.

The image is reflected from the mirror 110 parallel to the line of sight A onto a third plane mirror 124, which is disposed at 45° to the line A and thus reflects the image toward the line A in a direction perpendicular to it. The mirror 124 is located directly below a Penta prism 126 which has inclined surfaces 126a and 126b upon which the image from the mirror 24 impinges and by which the image is reflected at a compound angle onto the inclined back surface 126c. The compound angle reflection by the surfaces 126a and 126b reverses the image in the transverse direction end for end, as may be seen in FIG. 5, so that the image, as viewed through the image-receiving aperture 128 at the end of the case body 102, is oriented from side to side in the same position as the eye fundus would be if it were to be viewed from within the eye itself.

It should be noted, as mentioned above, that the mirrors 110, 123, and 124, together with the surfaces 126a and 126b of the Penta prism, invert the image so that it is viewed in an upright position. Moreover, the image of the eye fundus, as viewed through the image-viewing aperture 128, is positioned so that the image is viewed by the user of the ophthalmoscope on the direct line of sight between the observer's eye and the fundus of the eye to be observed. Thus, the normal relationship between the mind and the muscles of the user which would be in effect without the use of an instrument is retained. This is of considerable importance in retinal surgery. The invention provides, by means of a small device, an upright and unreversed image on the direct line of sight between the eye of the observer and the eye of the patient and constitutes a significant improvement over previously proposed instruments.

Although the image may be viewed directly through the image-viewing aperture 128, it is usually desirable to employ an eye piece 130, which may provide magnification, if desired. Desirably, the eye piece 130 is mounted, such as by a single screw 132, on appropriate locating formations on the case 102 and eye piece, so that it can be readily removed and replaced by another or by some other accessory. The ophthalmoscope may be viewed through a binocular eye piece worn by the observer. As another accessory for the ophthalmoscope, a bracket may be provided for fitting on the eye piece mount for attaching the ophthalmoscope to a "Polaroid" camera, a conventional still or movie camera or a television camera. The versatility of the ophthalmoscope is thus a further important advantage.

Another alternative embodiment of the invention is shown in FIG. 6. Most of the case 200 of this embodiment is not shown, only those portions which define an image-receiving aperture 202 and an image-viewing aperture 204 being included. The ophthalmoscope includes a composite objective lens 206, an illumination means which comprises a semi-transparent mirror 208, a composite illumination lens 210, a disc 212 containing a plurality of color filters through which the light may be passed, a disc 214 which contains a plurality of apertures each of which corresponds to a different light stop, and a light conducting rod 216. The light conducting rod 216 is connected to a flexible light-conducting cable which is in turn connected to a remote light source in the manner shown in FIG. 1.

The embodiment of FIG. 6 also includes an image correcting means 218 and a magnifying eye piece 220 which is mounted in the image-viewing aperture 204. The image correcting means 218 comprises a prism 218, another view of which is shown in FIG. 7. The prism 218 includes a first section 222 which forms a base that is triangular in cross section when viewed from a direction perpendicular to the line of sight of the scope, a second section 224 which is adjacent to the first section 222 and is quadrangular in cross section when viewed from a direction perpendicular to the line of sight, and a third section 226 adjacent to the first section 222 which forms a roof prism.

To explain the function of the ophthalmoscope of this embodiment, a ray of light from the fundus of an eye to be examined E' will be traced as it is reflected along the line of sight of the scope of FIG. 6 and passes through the center of the aperture 202. The path of this ray is represented by a broken line A'. The ray first passes through the objective lens 206 which is mounted in the aperture 202. It is not, of course, necessary that the objective lens be mounted directly in the aperture 202 so long as it is mounted near it. The ray then passes through the semi-transparent mirror 208 and into the image correcting means 218. The image corecting means 218 compensates for the effect of the lens of the eye E' to provide an erect and unreversed image at the image-viewing aperture 204.

As it enters the image correcting means 218, the ray follows the line of sight of the scope. It is reflected away from the line of sight by a first reflecting surface 228. The image of the fundus from the first reflecting surface 228 is received by a second reflecting surface 230, and is then reflected to a third reflecting surface 232 which is properly disposed so as to receive it. The image of the fundus from the third reflecting surface 232 is then received by the fourth reflecting surface 234. The image reflected by the surface 234, which forms part of the third (roof prism) section 226, reflects the image toward a surface 236 and a surface 238 of the roof prism. Because the ray which is being traced here passes through the center of the image-receiving aperture 202, it strikes the intersection of the surfaces 236 and 238. Other rays will, however, be reflected by one of these surfaces and then the other causing the image of the fundus to be reversed. The net effect of the reflecting surfaces 228, 230, 232 and 234 is to present a properly erect image. Accordingly, the present a properly erect image. Accordingly, the image of the fundus which is reflected from the roof prism section 236 towards the image-viewing aperture 204 and the eye piece 220 is erect and unreversed as compared to actual appearance of the fundus as viewed from inside the eye. It should be noted that an advantage of this embodiment, as compared to the embodiment of FIGS. 1–3, is that the ray which has been traced and which is reflected from the center of the roof prism 226 follows a path A' which falls entirely within a plane. Therefore the width of the scope is minimized.

An element of the illumination means which was not discussed above and which may be advantageously included in the scope is a light trap, or trap mirror, 240 which is disposed so as to receive the light from the rod 216 which passes through the semi-transparent mirror 208. A trap mirror of any appropriate type, such as a glass plate coated with a non-reflective coating, may be used. Such trap mirrors absorb about 80% or more of the light impinging on them. The function of the light trap 240 is to prevent this light which passes through the mirror 208 from being reflected into the objective lens 206 or the prism 218.

An important feature of this scope is that the light trap 240 is disposed within a plane which makes a small angle S with the line of sight of the scope. This is desirable because it minimizes the effect of any reflection from the light trap 240. The objective lens 206 is also disposed at a small angle to the line of sight to minimize back-reflections. In each case, the small angle should be between approximately 2° and 10° to the axis or line of sight of the instrument. An angle within this range has been formed to provide reflections of the illuminating light from the back surface of the objective lens and from the trap mirror in directions such that there is a minimum of interference with the fundus image being viewed. In the case of the trap mirror, the 20% or so of the light impinging on it that is reflected impinges on the back surface of the semi-transparent mirror 208 and is reflected up and back away from the line of sight. In the case of the objective lens, light reflected from the back, concave surface is reflected at an angle to the line of slight and therefore its interference with the image is greatly attenuated.

In the manufacture of the instruments it is preferable to set the angle of the lens 206 and the trap mirror 240 on each instrument, one by one, since there are unavoidable minor variations in the optical characteristics of each individual instrument that affect the setting. It is considered very important that the interval reflections of the illuminating light be reduced to the very lowest level attainable, and the provision of a trap mirror and the setting of the trap mirror and the lens at angles represent significant aspects of the invention insofar as these features contribute materially to the clarity of the image.

It is a highly advantageous feature of the embodiment of FIG. 6 that the half mirror 208 is disposed between the objective lens 206 and the image correcting means 218. This arrangement permits the greatest distance between the image-receiving aperture 202 and the eye E' which is being examined. Patients have a natural aversion to the placement of an examining instrument too close to their eye, and if a suitable distance is not maintained the examination procedure becomes difficult. The available distance between the lens 206 and the eye E' is limited by the focal length of the lens 206. Suitable objective lenses generally have rather short focal lengths.

It will be understood that the above described embodiments of the invention are merely exemplary and that many variations and modifications of them can be made by those skilled in the art without departing from the spirit and scope of the invention.

I claim:

1. An ophthalmoscope for observing the fundus of an eye comprising a case having a body portion and a handle portion, said body portion defining an image-receiving aperture and an image-viewing aperture, both apertures being disposed about a direct line of sight along which the fundus can be viewed, an objective lens mounted near said image-receiving aperture, an image correcting means disposed within said case for receiving an image of the fundus from said objective lens and presenting an erect and unreversed image at said image-viewing aperture, said image correcting means comprising a compound prism including first, second and third sections, said first section forming a base which is triangular in cross section when viewed from a direction perpendicular to the line of sight, said second section being adjacent to said first section and being quadrangular in cross section when viewed from a direction perpendicular to the line of sight, and said third section being adjacent to said first section and forming a roof prism, said compound prism having a first reflecting surface on said second section disposed at an angle to said line of sight from which the image of the fundus is reflected, a second reflecting surface on said second section disposed so as to receive the image from said first reflecting surface, a third reflecting surface on said first section disposed so as to receive the image from said second reflecting surface, a fourth reflecting surface on said third section disposed so as receive the image from said third reflecting surface, and said roof prism section being disposed so as to reverse the image from said fourth reflecting surface and to reflect it toward said image-viewing aperture along said direct line of sight, and an illumination means for directing a beam of light at the fundus comprising a remote light source, a flexible light-conducting cable for conducting light from said source into said case, and means for conducting light emitted from the cable onto the fundus of an eye.

2. An ophthalmoscope according to claim 1 wherein said light-conducting cable enters said case through said handle portion and terminates near the upper end thereof, and further comprising a disc mounted adjacent the upper end of said handle portion for rotation about an axis generally aligned with said handle portion, the disc carrying light filters in positions to be interposed in the light beam from said cable and said disc partially projecting from said case such that it may be turned by the thumb of the user's hand.

3. An ophthalmoscope according to claim 1 wherein the light conducting cable directs a beam of light from the light source along an axis transverse to the said line of sight and intersecting the line of sight at a region between the objective lens and the compound prism, and wherein the means for conducting light from the cable onto the fundus of an eye includes a semi-transparent mirror oriented to intercept the light beam emitted by the cable and reflect a portion of the light onto the fundus of an eye.

4. An ophthalmoscope according to claim 3 and further comprising light trap means positioned to intercept light passing through the semi-transparent mirror for absorbing a portion of such light and reflecting any non-absorbed light in a direction such that it does not interfere with the image of the fundus.

5. An ophthalmoscope according to claim 1 wherein the objective lens is positioned with its optical axis at an acute angle to the said line of sight.

6. An ophthalmoscope according to claim 4 wherein the acute angle is within the range of from about 2° to about 10°.

References Cited

UNITED STATES PATENTS

| 1,281,136 | 10/1918 | Clement | 351—6 |
| 1,687,030 | 10/1928 | Mitchell | 350—53 X |
| 3,035,483 | 5/1962 | Andreas et al. | 351—16 X |
| 3,089,398 | 5/1963 | Wilms | 351—7 X |
| 3,315,680 | 4/1967 | Silbertrust et al. | 351—6 X |

FOREIGN PATENTS

| 12,885 | 6/1912 | Great Britain | 351—6 |
| 627,621 | 3/1936 | Germany | 351—6 |
| 129,037 | 1960 | U.S.S.R. | 350—286 |

DAVID SCHONBERG, Primary Examiner

P. A. SACHER, Assistant Examiner

U.S. Cl. X.R.

128—395; 350—51, 54, 96 B, 203, 286; 351—16

PO-1050
(5/69)

UNITED STATES PATENT OFFICE
CERTIFICATE OF CORRECTION

Patent No. 3,664,730　　　　　　　　Dated May 23, 1972

Inventor(s) H. CARDONA

It is certified that error appears in the above-identified patent and that said Letters Patent are hereby corrected as shown below:

Column 1, line 52, "invention" should be --inversion--;
Column 2, line 24, insert --the-- after "so that"; Column 6, line 22, delete the semi-colon (;) after "portion"; line 41, "along the line" should be -- along that line--; Column 9, line 25, "line of slight" should be --line of sight--;
Column 10, line 11, insert --to-- after "so as"; line 50, "claim 4" should be --claim 5--.

Signed and sealed this 2nd day of January 1973.

SEAL)
ttest:

DWARD M.FLETCHER,JR.
ttesting Officer

ROBERT GOTTSCHALK
Commissioner of Patents